(12) United States Patent
Shelest et al.

(10) Patent No.: US 8,473,744 B2
(45) Date of Patent: *Jun. 25, 2013

(54) METHODS AND SYSTEMS FOR UNILATERAL AUTHENTICATION OF MESSAGES

(75) Inventors: Art Shelest, Sammamish, WA (US); David G. Thaler, Redmond, WA (US); Gregory O'Shea, Buckhurst Hill (GB); Michael Roe, Cambridge (GB); Brian D. Zill, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1503 days.

This patent is subject to a terminal disclaimer.

(21) Appl. No.: 11/555,573

(22) Filed: Nov. 1, 2006

(65) Prior Publication Data

US 2007/0061574 A1 Mar. 15, 2007

Related U.S. Application Data

(63) Continuation of application No. 10/010,352, filed on Nov. 13, 2001, now Pat. No. 7,134,019, which is a continuation-in-part of application No. 09/833,922, filed on Apr. 12, 2001, now Pat. No. 7,203,837.

(51) Int. Cl.
*H04L 9/32* (2006.01)
(52) U.S. Cl.
USPC .............................. 713/170; 713/162; 713/176
(58) Field of Classification Search
None
See application file for complete search history.

(56) References Cited

U.S. PATENT DOCUMENTS

| 5,473,691 | A | | 12/1995 | Menezes et al. |
| 5,511,122 | A | * | 4/1996 | Atkinson ..................... 713/153 |
| 5,673,319 | A | | 9/1997 | Bellare et al. |
| 5,729,608 | A | | 3/1998 | Janson et al. |
| 5,778,065 | A | | 7/1998 | Hauser et al. |
| 5,787,172 | A | | 7/1998 | Arnold |
| 5,892,904 | A | | 4/1999 | Atkinson et al. |
| 5,944,794 | A | * | 8/1999 | Okamoto et al. ............. 709/225 |
| 6,055,236 | A | * | 4/2000 | Nessett et al. ................ 370/389 |
| RE36,946 | E | * | 11/2000 | Diffie et al. .................. 380/278 |
| 6,148,405 | A | * | 11/2000 | Liao et al. ......................... 726/2 |
| 6,229,806 | B1 | * | 5/2001 | Lockhart et al. ............. 370/389 |
| 6,314,521 | B1 | * | 11/2001 | Debry ............................ 726/10 |

(Continued)

OTHER PUBLICATIONS

Greg O'Shea, Child-proof Authentication for MIPv6 (CAM), Jan.-Feb. 2000 ACM.*

(Continued)

*Primary Examiner* — Pramila Parthasarathy (57) ABSTRACT

Disclosed is an authentication mechanism that enables an information recipient to ascertain that the information comes from the sender it purports to be from. This mechanism integrates a private/public key pair with selection by the sender of a portion of its address. The sender derives its address from its public key, for example, by using a hash of the key. The recipient verifies the association between the address and the sender's private key. The recipient may retrieve the key from an insecure resource and know that it has the correct key because only that key can produce the sender's address in the message. The hash may be made larger than the sender-selectable portion of the address. The recipient may cache public key/address pairs and use the cache to detect brute force attacks and to survive denial of service attacks. The mechanism may be used to optimize security negotiation algorithms.

20 Claims, 10 Drawing Sheets

U.S. PATENT DOCUMENTS

| | | | |
|---|---|---|---|
| 6,367,012 | B1 | 4/2002 | Atkinson et al. |
| 6,421,673 | B1* | 7/2002 | Caldwell et al. ............... 707/10 |
| 6,526,506 | B1* | 2/2003 | Lewis ........................... 713/153 |
| 6,600,823 | B1* | 7/2003 | Hayosh ........................... 380/51 |
| 6,782,474 | B1* | 8/2004 | Ylonen ........................ 713/162 |
| 6,938,154 | B1* | 8/2005 | Berson et al. ................. 713/156 |
| 7,134,019 | B2* | 11/2006 | Shelest et al. ................. 713/170 |
| 7,203,837 | B2* | 4/2007 | O'Shea et al. ................. 713/170 |
| 7,370,197 | B2* | 5/2008 | Huitema ....................... 713/162 |
| 2006/0020807 | A1* | 1/2006 | Aura et al. .................... 713/176 |

OTHER PUBLICATIONS

Aura et al., *Security of Internet Location Management*, Proc. 18th Annual Computer Security Applications Conference, IEEE Press, Nevada (Dec. 2002).

Blaze et al., *The KeyNote Trust-Management System Version 2*, IETF Network Working Group, RFC 2704 (Sep. 1999) pp. 1-35.

Eastlake, *Domain Name System Security Extensions*, IETF Network Working Group, RFC 2535 (Mar. 1999) pp. 1-44.

Ellison et al., *SPKI Certificate Theory*, IETF Network Working Group, RFC 2693 (Sep. 1999) pp. 1-41.

Ferguson et al., *Network Ingress Filtering: Defeating Denial of Service Attacks Which Employ IP Source Address Spoofing*, IETF Network Working Group, RFC 2827 (May 2000) pp. 1-10.

Housley et al., *Internet X.509 Public Key Infrastructure Certificate and Certificate Revocation List (CRL) Profile*, IETF Network Working Group, RFC 3280 (Apr. 2002) pp. 1-66.

Karn et al., *Photuris: Session-Key Management Protocol*, IETF Network Working Group, RFC 2522 (Mar. 1999) pp. 1-75.

Montenegro et al., *Statistically Unique and Cryptographically Verifiable (SUCV) Identifiers and Addresses*, Proc. ISOC Symposium on Network and Distributed System Security (NDSS 2002), San Diego (Feb. 2002) pp. 1-13.

Moskowitz, *Host Identity Payload and Protocol*, Internet Draft <draft-ietf-moskowitz-hip-05.txt> (Oct. 2001)(work in progress) pp. 1-28.

Narten et al., *Privacy Extensions For Stateless Address, Autoconfiguration In IPv6*, IETF Network Working Group, RFC 3041(Jan. 2001) pp. 1-16.

Narten et al., *Neighbor Discovery for IP Version 6 (IPv6)*, IETF Network Working Group, RFC 2461 (Dec. 1998) pp. 1-87.

Nikander, *A Scaleable Architecture for IPv6 Address Ownership*, Internet Draft <draft-nikander-ipng-pbk-addresses-00.txt> (work in progress) (Mar. 2001) pp. 1-27.

Okazaki et al., *Securing MIPv6 Binding Updates Using Address Based Keys (ABKs)*, Internet-Draft <draft-okazaki-mobileip-abk-01.txt> (Oct. 2002) (work in progress) pp. 1-26.

Roe et al., *Authentication of Mobile IPv6 Binding Updates and Acknowledgments*, Internet Draft <draft-roe-mobileip-updateauth-02.txt> (Feb. 2002) (work in progress) pp. 1-22.

Savola,*Security of IPv6 Routing Header and Home Address Options* Internet Draft <draft-savola-ipv6-rh-ha-security-.03.txt> (work in progress) (Dec. 2002).

Shamir, *Identity-Based Cryptosystems and Signature Schemes*, Advances in Cryptology: Proc. CRYPTO 84, vol. 196 of LNCS (1998) pp. 47-53.

Arkko et al., *Securing IPv6 Neighbor and Router Discovery*, Proc. 2002 ACM Workshop on Wirless Security (WiSe) (ACM Press) (Sep. 2002) pp. 77-86.

Aura, *Cryptographically Generated Addresses (CGA)*, Internet Draft <draft-aura-cga-00.txt> (work in progress) (Feb. 2003) pp. 1-13.

O'Shea et al., *Child-Proof Authentication for MIPv6 (CAM)*, ACM Computer Communications Review, 31(2) (Apr. 2001) pp. 1-5.

Big Internet, "Archives of the "Big Internet" Mailing List", http://gd.tuwien.ac.at/infosys/network/does/ietf.orq/concluded-wg-ietf-mail- archive/big-internet/1994-07; retrieved Aug. 25, 2006; p.20

\* cited by examiner

FIG. 2

PRIOR ART

| PKD Address (PKD) 310 | Public Key 302 | Modifier 304 | Time Stamp (t) 502 | Intended Recipient (C) 504 | Signature {H(PKD, C, t, D)}Sk 506 | Authenticated Message Content Data (D) 508 | Non-Authenticated Message Content Data 510 |

Authenticated Message 500

METHODS AND SYSTEMS FOR UNILATERAL AUTHENTICATION OF MESSAGES

RELATED APPLICATION

This application is a continuation of U.S. patent application Ser. No. 10/010,352, filed Nov. 13, 2001 which is a continuation-in-part of U.S. patent application Ser. No. 09/833,922, filed on Apr. 12, 2001, which is in incorporated herein in its entirety.

TECHNICAL FIELD

The present invention relates generally to communications in computer networks, and, more particularly, to information authentication in connection with communications between network nodes.

BACKGROUND OF THE INVENTION

Authentication is an important issue in many types of network communications. Many messages are meaningful only if the recipient can verify the identity of the sender. In some cases, the recipient associates a particular characteristic with a sender's identity. When a message is received that is known to come from that sender, the recipient refers to the characteristic in deciding what action to take. For example, a company employee associates the characteristic "authority to issue certain orders" with the company's president. Upon receiving the message "Take tomorrow off," the employee treats the message with more respect if the message is known to come from the company president than if it came from an anonymous person. In another example, the recipient associates the characteristic "truth in reporting" with the identity of certain news outlets but not with other news outlets nor with the populace in general. Even if a message is received from a sender for whom the recipient has no pre-established association, the sender's identity may be meaningful in linking multiple messages together. For example, a police department receiving the message "False alarm: I'm not being robbed after all" would presumably accept the message at face value only if it could verify that the sender was indeed the same person who sent the earlier "Help! I'm being robbed!" message.

In network communications, an often used form of identity is the network address used by a device to identify itself on the network. Messages are typically tagged with this form of identity, which can be used by a recipient to address a message in response. However, a nefarious party may easily send a message with a deceptive sender's address. Without an authentication mechanism to verify that the sender's network address as contained in the message is actually the address where the message originated, this form of identity is vulnerable to fraudulent misrepresentation.

Protocols address the problem of fraudulent misrepresentation by implementing authentication services. The recipient of a message uses the authentication services to verify the identity of the sender of the message. The recipient then takes action based on the characteristics associated with the sender's identity. For example, the Internet Engineering Task Force Request for Comments (IETF RFC) 2401 "Security Architecture for the Internet Protocol" describes the use of IPsec authentication in restricting the acceptance of messages to those originating from authenticated senders. Other protocols provide similar authentication services. However, one perceived difficulty in implementing authentication is that some of these authentication services provide their security by means of quite complicated mechanisms. They come at a heavy perceived price in terms of a significant investment in administrative and communicative overhead.

The parent of the present application discloses a unilateral authentication mechanism that provides much of the security of heavyweight authentication mechanisms, but with lower administrative and communicative overhead. The present application discloses implementation options usable with the unilateral authentication mechanism and describes scenarios in which unilateral authentication may be profitably employed.

SUMMARY OF THE INVENTION

In view of the foregoing, the present application provides a simple unilateral authentication mechanism that enables an information recipient to quickly ascertain that the information comes from the sender it purports to be from. This authentication mechanism integrates a private/public key pair with the selection by the sender of a portion of its network address. The sender derives its network address from its public key, for example, by using a hash of the public key. The recipient verifies the association between the network address and a private key held by the sender, i.e., the information could only have come from a sender for whom the network address was selected.

Authentication information may be sent to the recipient in a packet option of a message. Then, if the recipient does not understand the authentication protocol, it may ignore the packet option and accept the message, albeit without the protection provided by the authentication mechanism.

The sender may, but need not, send its public key directly to the recipient. The recipient may also retrieve the key from an insecure resource, such as a key posting service. Because this resource is not secure, the recipient may receive several erroneous keys in addition to a correct key. However, this is not a problem as the recipient knows which is a correct public key because incorrect keys cannot produce the sender's address in the message.

The hash may be made larger than the portion of the address generated by the sender. To avoid possible conflicts between the results of the hash and portions of the address not settable by the sender, the sender chooses a modifier, appends it to the public key, hashes the result, and repeats with other modifiers until the results of the hash match the non-selectable portions of the network address.

The recipient may cache public key/address pairs. Then, the sender need not send the public key in every message (or in any message, as described above). This cache may be used to detect brute force attacks wherein a malicious attacker tries different keys until it finds one whose hash matches the selectable portion of the sender's address. Whenever the recipient receives two messages from the same address but with different public keys, it knows that it is under attack. The cache is also useful in surviving denial of service attacks: when flooded with incoming messages, the recipient discards any message whose public key/address is not in the cache. The recipient does this without going through the expense of decoding authentication information in every message. Upon receipt of a public key/address pair not in the cache, the recipient may request the public key from the sender (or from a third party, as described above).

If the authentication information is used to sign the entire message, then only the sender with the private key can create a valid message. This prevents "Man in the Middle" attacks wherein a device intercepts a message, alters it, and sends it along: unless the intercepting device has the private key, its altered message will be detected by the recipient as invalid. As another result of the fact that only the holder of the private key can create a valid message, the sender cannot later repudiate a message it has sent.

As one more consequence of the fact that signing the entire message prevents anyone but the authenticate sender from creating a valid message, the present invention may be used to optimize the Internet Key Exchange and other security negotiation algorithms.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment. The following description is based on embodiments of the invention and should not be taken as limiting the invention with regard to alternative embodiments that are not explicitly described herein. Sections I through III describe the basics of the unilateral authentication mechanism. Section IV presents implementation options useful in particular situations. Section V shows how the authentication mechanism operates in situations beyond those discussed in Sections I through III.

I. Exemplary Environment

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 1:
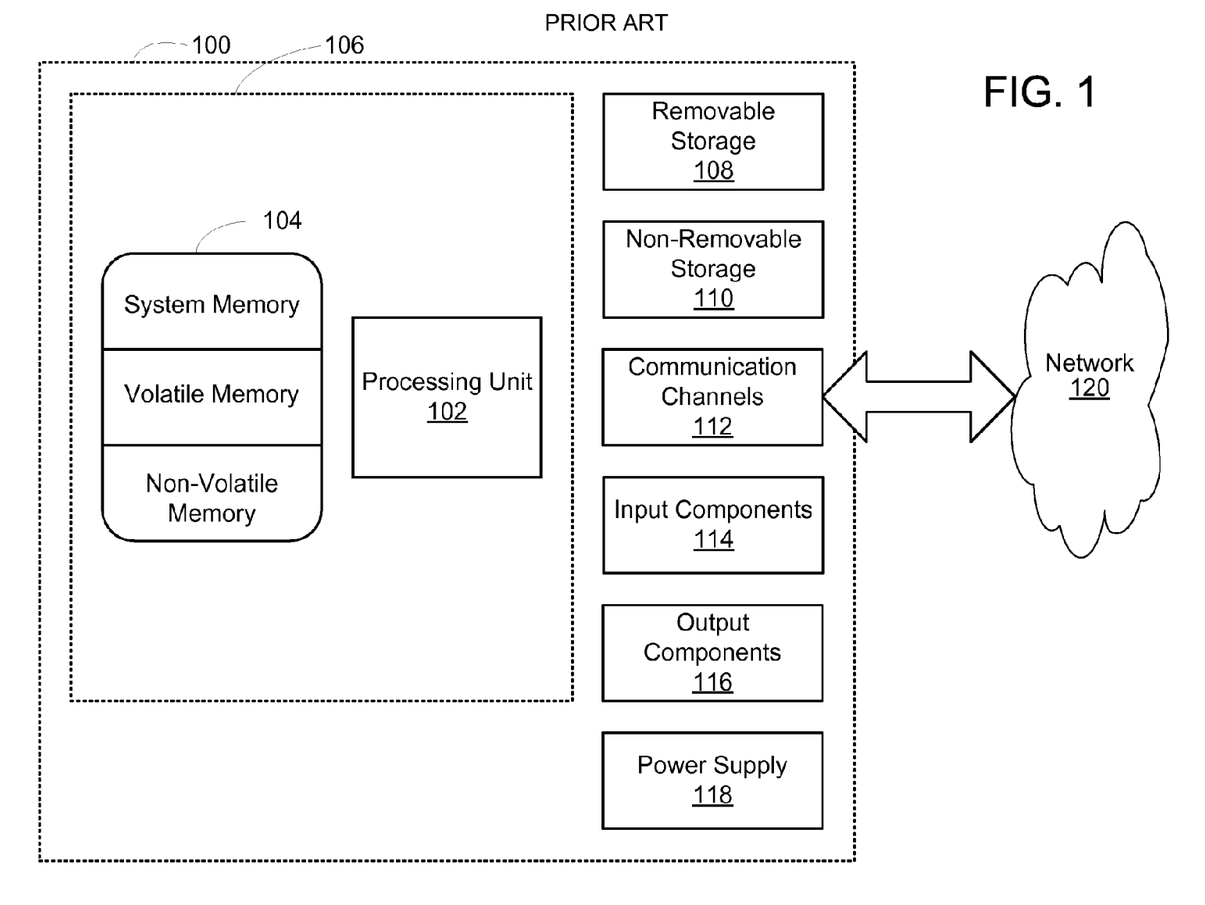
FIG. 1 is a schematic diagram showing an exemplary computer architecture on which the mechanisms of the invention may be implemented.

Referring to FIG. 1, the present invention relates to communications between network nodes on various connected computer networks. Each of the network nodes may reside in a computer that may have one of many different computer architectures. For descriptive purposes, FIG. 1 shows a schematic diagram of an exemplary computer architecture usable for these devices. The architecture portrayed is only one example of a suitable environment and is not intended to suggest any limitation as to the scope of use or functionality of the invention. Neither should the computing devices be interpreted as having any dependency or requirement relating to any one or combination of components illustrated in FIG. 1. The invention is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing device typically includes at least one processing unit 102 and memory 104. The memory 104 may be volatile (such as RAM), non-volatile (such as ROM, flash memory, etc.), or some combination of the two. This most basic configuration is illustrated in FIG. 1 by the dashed line 106. The devices may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks (DVD), other optical storage, magnetic cassettes, magnetic tape, magnetic disk storage, other magnetic storage devices, and any other media that can be used to store the desired information and that can be accessed by the computing device. These devices may also contain communication channels 112 that allow the host to communicate with other devices. Communication channels 112 are examples of communications media. Communications media typically embody computer-readable instructions, data structures, program modules, or other data in a modulated data signal such as a carrier wave or other transport mechanism and include any information-delivery media. The term "modulated data signal" means a signal that has one or more of its characteristics set or changed in such a manner as to encode information in the signal. By way of example, and not limitation, communications media include wired media, such as wired networks and direct-wired connections, and wireless media such as acoustic, radio, infrared, and other wireless media. The term computer-readable media as used herein includes both storage media and communications media. The devices may also have input components 114 such as a keyboard, mouse, pen, a voice-input component, a touch-input device, etc. Output components 116 include screen displays, speakers, printer, etc., and rendering modules (often called "adapters") for driving them. Each of the devices has a power supply 118. All these components are well known in the art and need not be discussed at length here.

II. The Problem of Authentication

The present invention is directed to a simplified, lightweight, authentication mechanism for a recipient of a message to authenticate the message, i.e., to determine whether the message is from the sender it purports to be from. This authentication mechanism may be advantageously used for providing adequate network security with respect to any type of messages sent for any reason.

Figure 2:
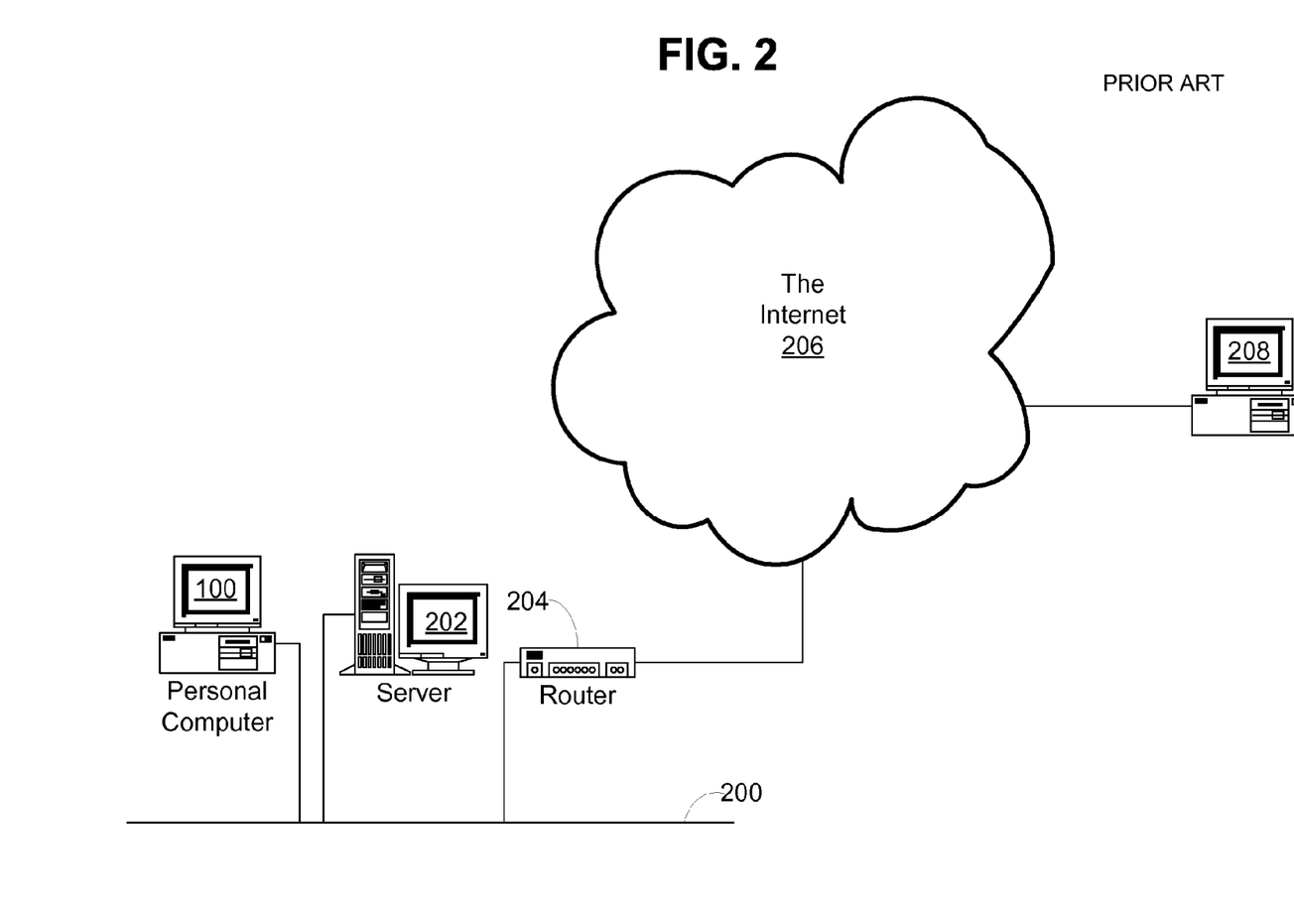
FIG. 2 is a schematic diagram showing an exemplary communications network in which the invention may be practiced for authenticating messages.

To facilitate an understanding of the need for a lightweight, low-overhead, and easily deployable authentication mechanism such as the one provided by the invention, consider the exemplary network set up of FIG. 2. Accompanying a computing device 100 on a local area network (LAN) 200 is a server 202 and a router 204. The router allows the devices on the LAN to communicate over an internetwork 206 to remote computing devices such as device 208. The Internet is one example of an internetwork. Any of the devices, including the router, in FIG. 2 may send a message to any other device. In protocols typically used today, the message contains the network address of the sender (the "from address") and the network address of the recipient ("to address"). Consider, as a first example, that device 100 is operated by a systems administrator authorized to reconfigure the router 204. For security's sake, the router does not accept commands from devices other than device 100. But when the router receives a reconfiguration command message with its from address set to the address of device 100, it believes the message is authentic and carries out the command. (Note that this example is for illustrative purposes only: router communications are generally much more secure than is depicted here.) However, it is very easy to create and send a message with a deceptive from address. For example, device 208 could create a router reconfiguration command message and put device 100's network address in the from address field. Without a mechanism for authenticating a message, the router cannot know which device actually sent the message. The router does not know that the message is not authentic and carries out the command, possibly compromising the security of all of the devices on the LAN. As a second example, device 100 uses a "Neighbor Discovery" protocol to discover which router it should use when communicating with remote devices such as device 208. Without an authentication mechanism in place, device 202 may impersonate router 204. Messages from device 100 intended for device 208 would then go to device 202 which may read their contents, discard them (thus launching a denial of service attack against device 100), or alter them before sending them on to device 208. These two examples are intended to show the ubiquity of the need for authentication. They can be extended to any sort of message sent to any sort of device using any sort of communications method or protocol.

To fend off such attacks, a recipient of a message needs to authenticate the sender of the message, that is, determine if the message was actually sent by the "sender" indicated in the message. Then the recipient can choose to act on the message only if it is sent by an appropriate device. The next section details how the present invention enables this authentication.

III. Unilaterally Authenticating a Message

The invention enables a device, such as the computing device 100, to write a message in such a way that the message could only have been written by this particular device. This authentication mechanism is unilateral in that the recipient does not need to have further communications with the sender for completing the authentication process. This is because the message contains everything the message recipient, such as the router 204, needs to decode the message and to determine that it must have come from this particular device.

The invention is based on public key/private key cryptography used in combination with the selection of a network address of the message sender based on the public key. This selected network address is called the Public Key-Derived (PKD) address. In the example of FIG. 2, the PKD address is an address of the computing device 100. One way this address may be derived from the public key of the device is described in connection with FIGS. 3 and 4. In step 400, the sending device selects a cryptographic key pair with a private key 300 and a public key 302. Modern network addresses, such as those used in IPv6, are composed of two parts. The first part, called the route prefix 308, contains a routable address that can be used to route a message to an appropriate network link. In step 402, the sending device sets the route prefix 308 of its PKD address 310, possibly by listening on its network link for advertisements from the local router 204. For details on how this works on an IPv6 network, see the IETF RFC 2462 "IPv6 Stateless Address Autoconfiguration."

Figure 3:
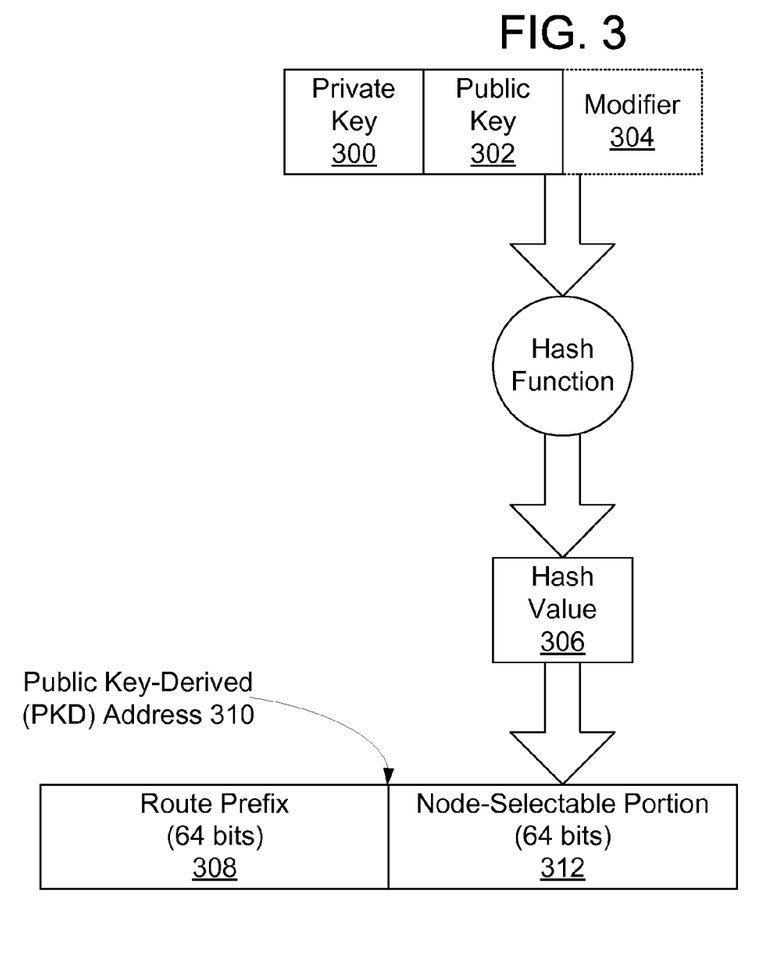
FIG. 3 is a schematic diagram illustrating how portions of a Public Key-Derived (PKD) address are derived from a public key of the sending device.
Figure 4:
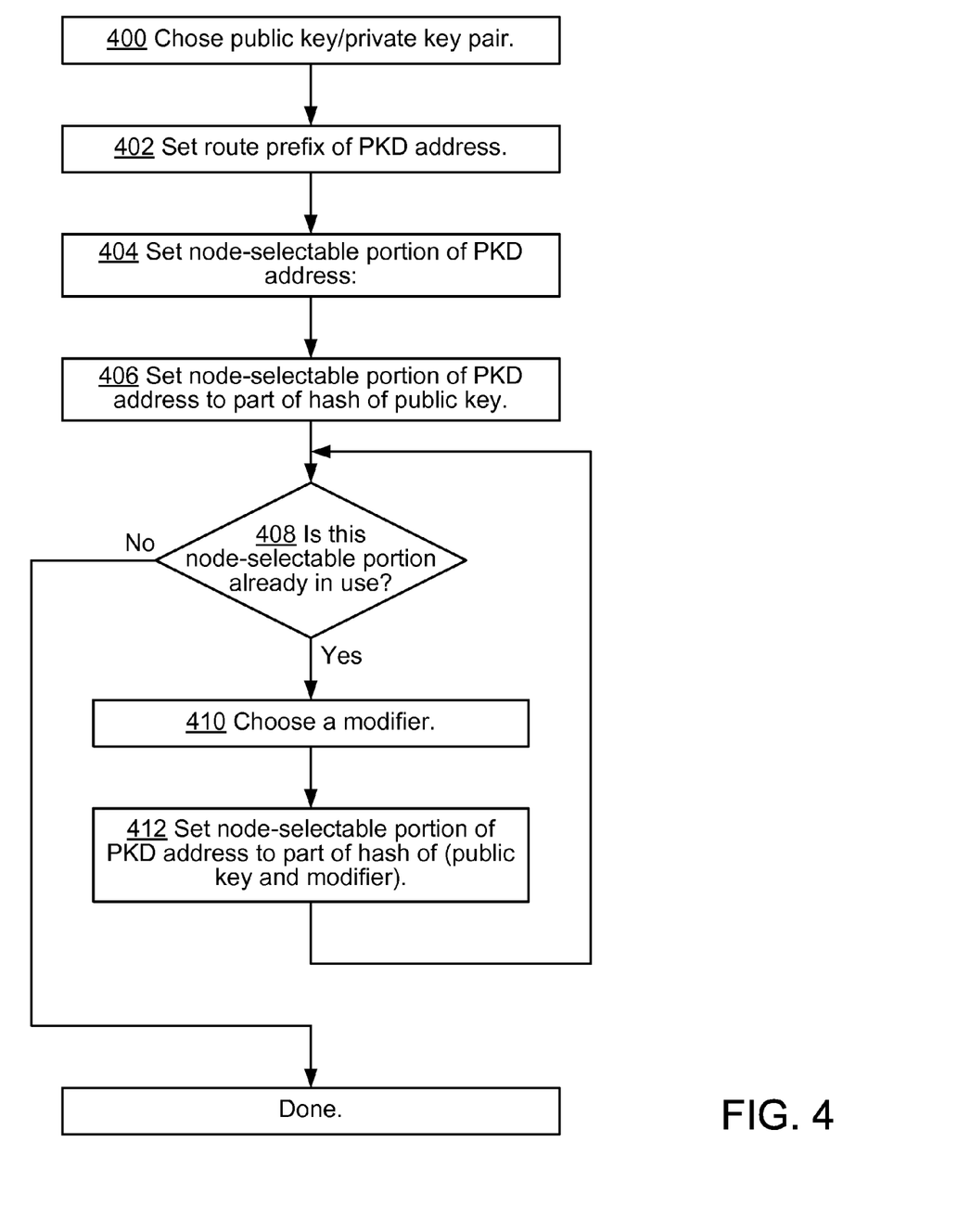
FIG. 4 is a flowchart of a procedure for setting a PKD address of the sending device.

Starting in step 404, the sending device sets the second part of its PKD address. This part is called the "node-selectable" portion 312 because the sending device is free to set this part as it sees fit. In IPv6, the node-selectable portion is called the "interface identifier" and is often set to the network interface's Medium Access Control (MAC) address. Here, however, in accordance with one embodiment of the invention, the sending device in step 406 creates a hash 306 of the public key 302 and selects part of the hash to be the node-selectable portion 312 of its PKD address. In IPv6, the interface identifier comprises 64 bits, but two of those bits (the "u" and "g" bits) should be set to zero, leaving the sending device to choose 62 bits of the hash for the remainder of the interface identifier. While it is not intrinsically important which bits the sending device chooses, its procedure should be well known so that a recipient of the message can recreate the PKD address as will be described in greater detail below. For instance, the sending device may choose the lowest-order 62 bits of the hash 306 for use as the interface identifier. In step 408, the sending device checks whether this address is already in use by another node in the network. In other words, the sending device checks whether there is an address conflict with respect to the PKD address it has generated. Different protocols may provide different ways of determining this. For IPv6, the mechanism is called "duplicate address detection." If the address is not already in use, the process of constructing the PKD address of the sending device is complete. If the constructed PKD address is in use by another device, however, the sending device in step 410 chooses a modifier 304, which may be, for example, a two-bit integer. The sending device appends the modifier 304 to the public key 302, in step 412 creates a hash of the composite number, and again tests to see if the generated address is unique. If necessary, the sending device continues to loop through steps 408, 410, and 412 choosing different modifiers until one is found to produce a PKD address that is not used by another device. In some embodiments, the sending device may choose to always use a modifier in which case it jumps directly from step 404 to step 410, looping if necessary to find an appropriate modifier.

By constructing the unique PKD address of the sending device based on its public key, an association between the PKD address of the sending device and its public/private key pair is created. This association is then used in the authentication mechanism of the invention to allow a recipient of a message to authenticate the sender of the message by verifying the association.

Figure 5:
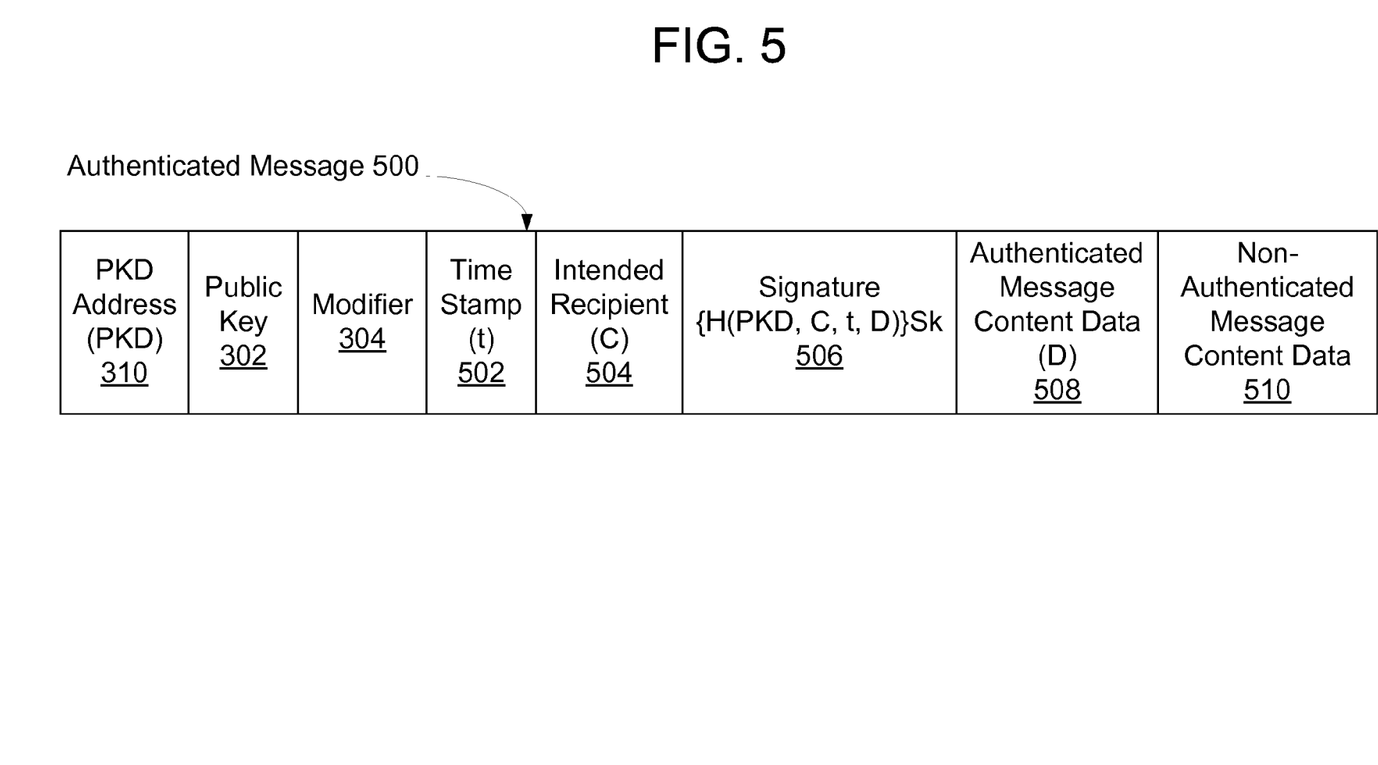
FIG. 5 is a block diagram showing a data structure of an exemplary authenticated message.
Figure 6:
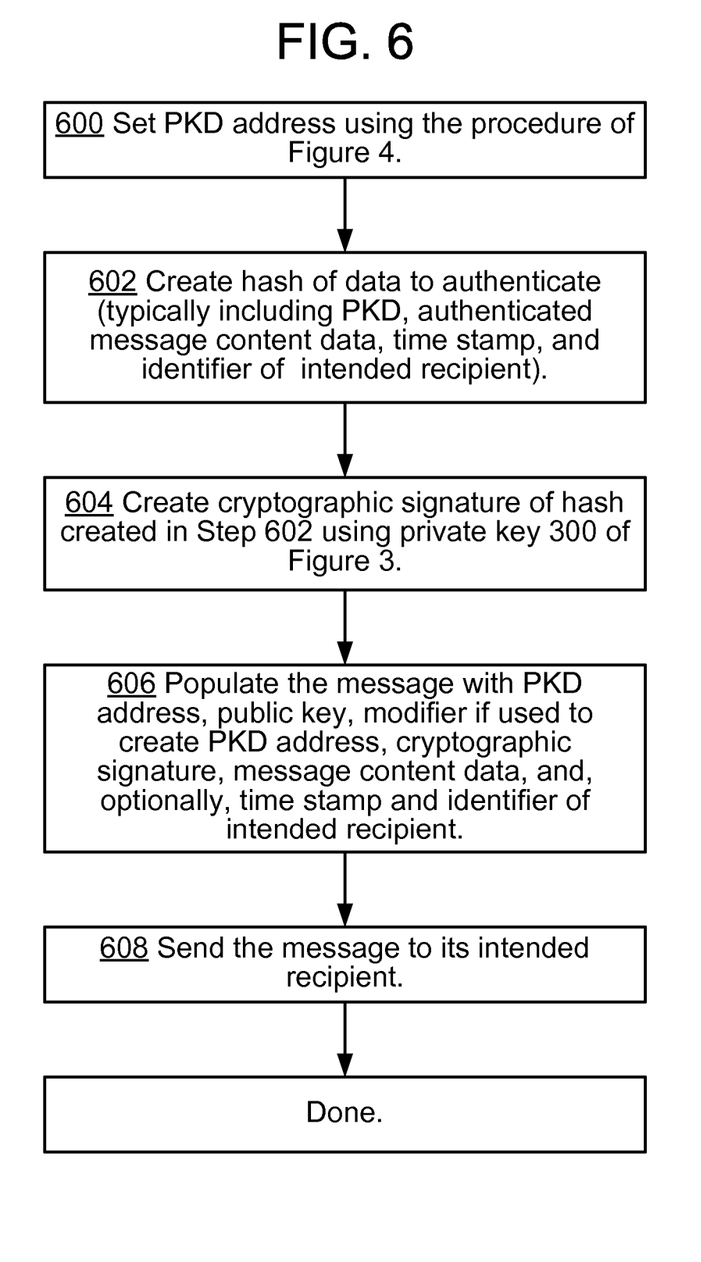
FIG. 6 is a flowchart of a procedure for creating an authenticated message by the sending device.

Referring now to FIGS. 5 and 6, the sending device sends an authenticated message 500 to its recipient. The message contains, among other things such as the standard IP header, message content data 508 and 510, the PKD address 310, and the public key 302 of the sending device. The message content data in FIG. 5 are divided into two fields 508 and 510 because the sender may choose to use the methods of the present invention to authenticate some, all, or none of the message content data. In one embodiment, the message also contains data for preventing a replay attack. Such data may include, for instance, a time stamp 502 and data 504 identifying the intended recipient of the message. The identifier of the recipient may be anything that uniquely identifies the recipient and will often be the recipient's network address. The message content data, PKD address, public key, and the optional data may be in plain text (i.e., not hashed or encrypted).

In addition to the plain text data, the message further includes a digital signature 506 generated from data included in the message. To generate this signature, the sending device in step 602 creates a hash of the data to authenticate. These data typically include the PKD address 310 it set earlier, the authenticated portion of the message content data 508, and the optional data such as the time stamp 502 and the identifier of the intended recipient 504. In step 604, a cryptographic signature 506 of the hash generated in step 602 is created from the hash using the private key 300 associated with the public key 302, which was used to create the PKD address of the sending device. In step 606, the authenticated message 500 is populated with the message content data 508 and 510, the cryptographic signature, the PKD address, any optional data that went into forming the signature, the public key, and the modifier 304 if it was used in creating the PKD address.

Figure 7:
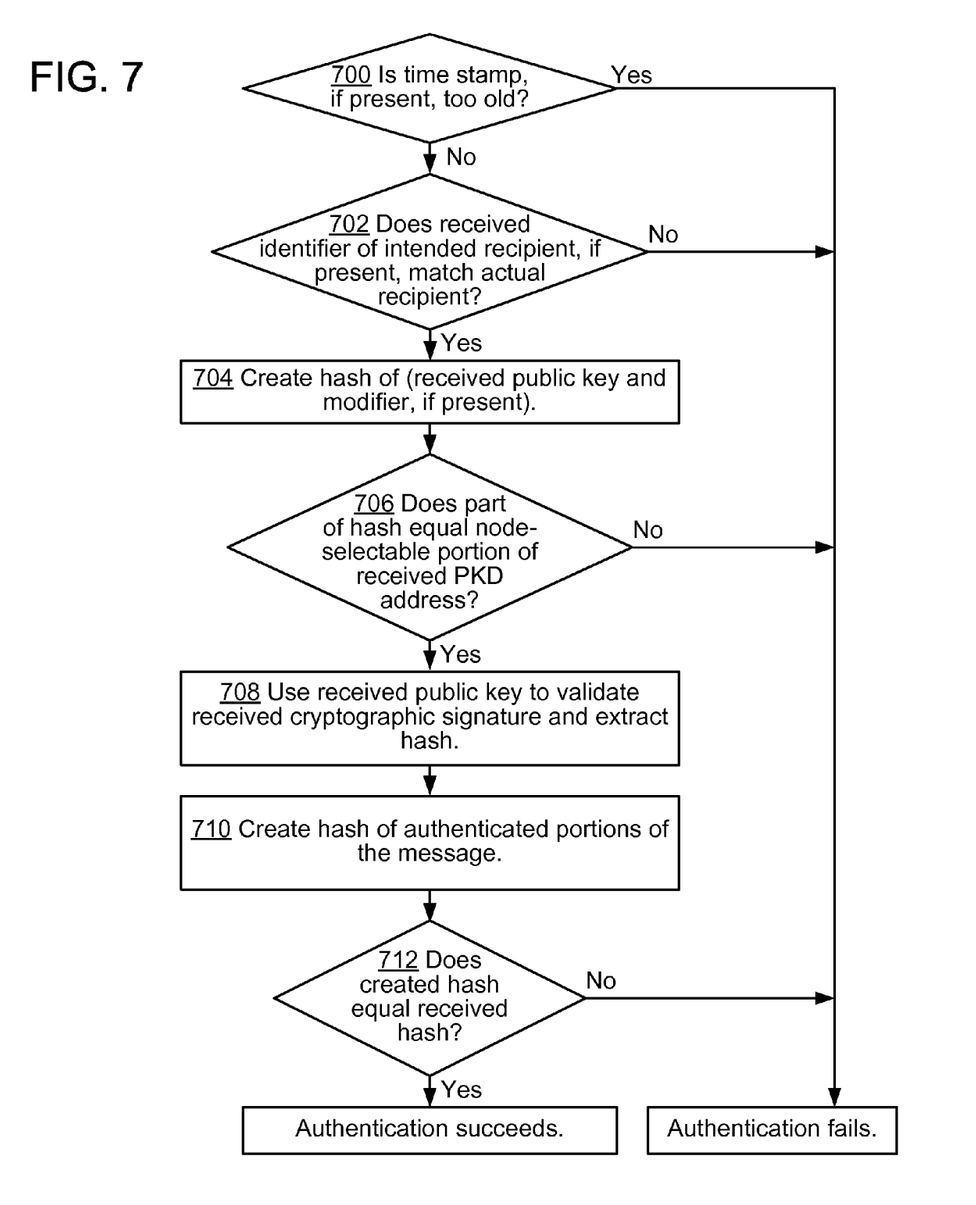
FIG. 7 is a flowchart of a procedure for authenticating a message from the sending device.

When the recipient receives the authenticated message 500, it performs the process in FIG. 7 to decode the message and to attempt to authenticate the identity of the sender of the message. Note that, for the most part, these steps may be performed in any order. In step 700, if there is a time stamp 502 in the message, the recipient compares it to its local time, which should be synchronized with the clock of the sending device to within a few seconds. The recipient discards the message if it deems the message to be too old. In step 702, if the message contains an identifier of the message's intended recipient 504, the recipient compares the identifier in the message with its own identification and discards the message if there is no match. In steps 704 and 706, the recipient uses the public key included in the message to recreate the node-selectable portion of the sender's PKD address. This operation is identical to that of step 412 of FIG. 4. Specifically, the recipient hashes the message's public key and modifier, if present, and then takes part of the results of the hash to be the node-selectable portion of the sender's address. Then the recipient compares the value for the node-selectable portion it has generated from the public key with the node-selectable part of the PKD address 310 in the message. If the two values differ, then there is something amiss, and the recipient discards the message. On the other hand, if the two values match, the recipient knows that public key included in the message is the one used to create the PKD address.

In step 708, the recipient uses the public key 302 in the message to validate the cryptographic signature 506 and extracts the hash that was used to form the signature. In steps 710 and 712, the recipient follows the procedure of step 602 of FIG. 6 to recreate the hash using the data included in the message. If the hash created by the recipient does not match the hash extracted from the cryptographic signature in the message, then the recipient discards the message. If the hash values match, then the recipient knows that the cryptographic signature was written by a device that knows the private key 300 that corresponds to the public key 302 in the message. The recipient also knows, by the results of step 706, that this public key 302 is the one used to create the sender's PKD address 310. Therefore, the recipient knows that the message must have been written by the device that created the PKD address 310, the only device with the private key 300, that is to say, by the sending device. The sending device's address has been verified, and the recipient is now free to accept the authenticated message content data 508 as authentic and to act on them accordingly.

IV. Further Embodiments of Unilateral Authentication

The authentication information may be provided to the recipient in any number of ways. For example, the information may be placed in an IPsec Authentication Header or Encapsulating Security Payload, or in a packet option. If a packet option is used, and the recipient does not understand the unilateral authentication mechanism, then it can discard the packet option and accept the remainder of the message. Of course, this recipient does not benefit from the authentication mechanism, but at least it can understand and use the message contents.

For clarity's sake, the discussion so far depicts all of the authentication information as arriving at the recipient in a single message. (See, for example, FIGS. 5 and 7 and accompanying discussion.) This is not necessary for the mechanism to work. As public keys can be quite large, in some embodiments the sender can shorten its messages by leaving the public key out of each message. The sender delivers its public key to a key publishing service. (Note that the key publishing service may in implemented on the same device as the sender.) When a message is received, the recipient requests the sender's public from the publishing service. Because communications with the publishing service may not be secure, nefarious agents may intercept the request and attempt to fool the recipient. In response to its request, the recipient may receive several invalid public keys along with the one valid key. That is not a problem, however. The recipient uses each received public key in turn in the procedure of FIG. 7. Only the valid public key leads to a successful authentication. Having found the valid key, the recipient can store it for future use. If none of the received keys works, then the recipient discards the message.

As a general rule of thumb, the cryptographic strength of an authentication mechanism that uses a hash increases with the number of bits produced by the hash. However, the number of usable bits is often restricted by other considerations. In FIGS. 3 and 4 and the accompanying discussion, for example, the number of hash bits usable is restricted by the size of the node-selectable portion of the sender's address. In an IPv6 unicast address, this portion is 62 bits long (excluding the "u" and "g" bits whose values may not be set by the sender). One aspect of the present invention provides a way to increase security while adhering to these bit restrictions. Returning to FIG. 3 and the procedure of FIG. 4, let the hash value 306 be 64 bits long. Then, as an additional part of step 408, compare two bits of the hash value to the "u" and "g" bits. If there is a match, use 62 bits of the hash value as the node-selectable portion 312, as before. If there is no match, then choose another modifier 304 and repeat until a match is found. In this example, security is enhanced by producing a 64-bit hash rather than a 62-bit hash, while staying within the 62-bit restraint of the node-selectable portion 312. This method is quite general, with its scope depending upon the particular addressing scheme in use. As an example of the method's scope, again consider IPv6. Typically, the lowest-order 16 bits of an IPv6 route prefix define a subnet. A hash of up to 80 bits (62 node-selectable bits, "u" bit, "g" bit, and the 16-bit subnet) may be formed and discarded if the "u" and "g" bits are incorrect or if the generated subnet is invalid.

The techniques discussed so far prevent another device from spoofing the node-selectable portion (312 in FIG. 3) of a sender's PKD address 310. The technique may be extended to prevent spoofing of the route prefix 308 of the PKD address as well. Again consider FIGS. 3, 4, and 7. The inputs to the hash functions of steps 406 and 412 are extended to include at least a portion of the route prefix 308 as well as the public key 302 and, possibly, the modifier 304. The balance of the procedure of FIG. 4 remains the same. On receiving a message, the recipient uses the same portion of the route prefix to create the hash in step 704 of FIG. 7. The balance of the procedure of FIG. 7 remains the same. If the authentication succeeds in FIG. 7, then the recipient knows that the portion of the route prefix used to create the hash is authentic. One would expect that the entire route prefix would normally be used in authentication, but that need not be the case.

V. Applications of Unilateral Authentication

The methods of the present invention are applicable to several other applications. The authentication mechanism associates an authenticated message with its creator. If the authentication information is used to sign the entire message, then only a message creator with the private key can create a valid message. This aspect prevents "Man in the Middle" attacks wherein an attacker intercepts a message, alters it, and sends it along, presenting the altered message as if it were the product of the original creator. Unless the intercepting attacker has the sender's private key, its altered message will be detected by the recipient as invalid. As another aspect of the bond between an authenticated message and its creator, the creator cannot later repudiate a message it has sent. Yet another consequence of the fact that signing the entire message prevents anyone but the authenticate sender from creating a valid message, the present invention may be used to optimize the Internet Key Exchange and other security negotiation algorithms.

Figure 8A:
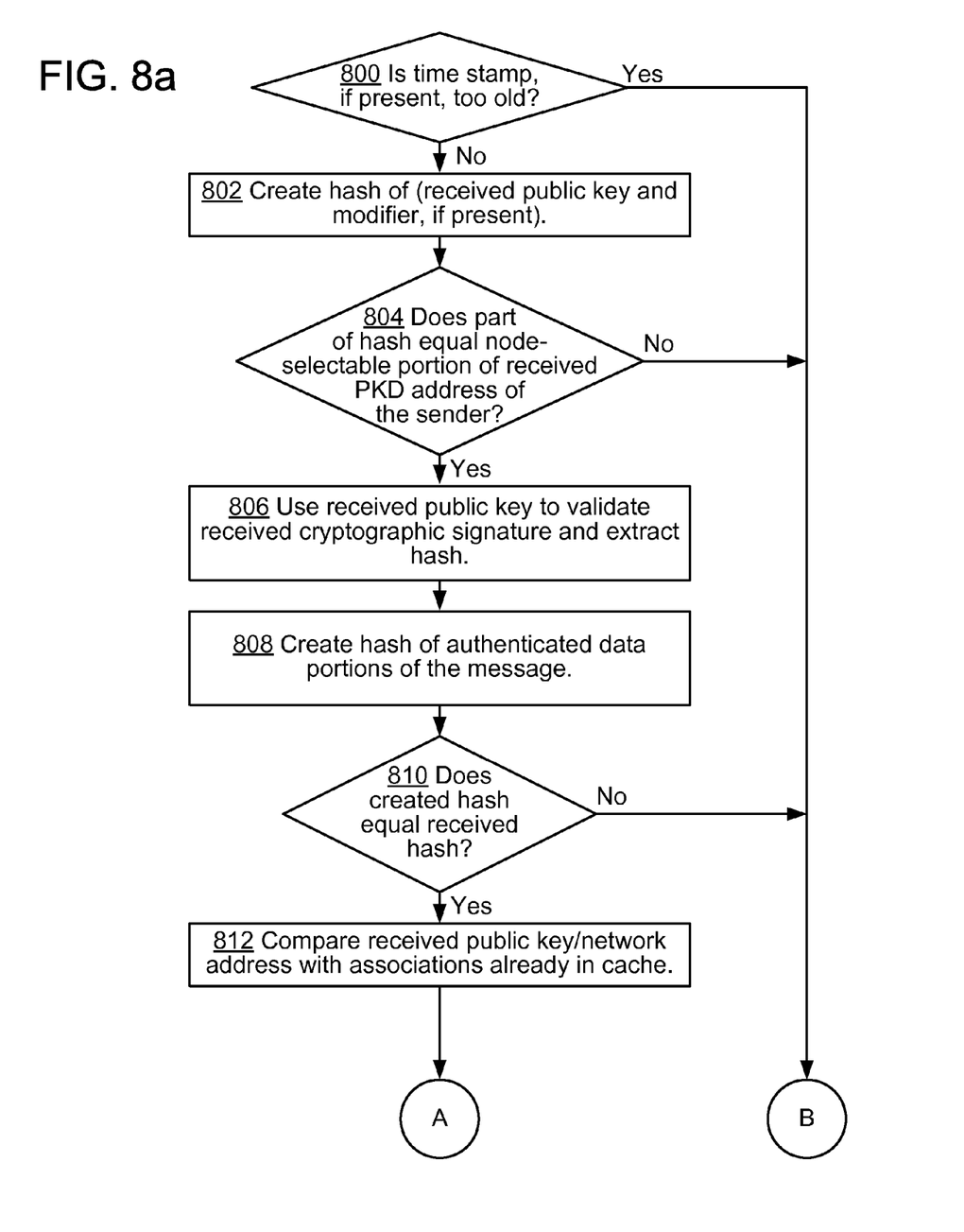
FIGS. 8a and 8b are a flowchart of a procedure for building and maintaining a cache of valid public key/network address associations.
Figure 8B:
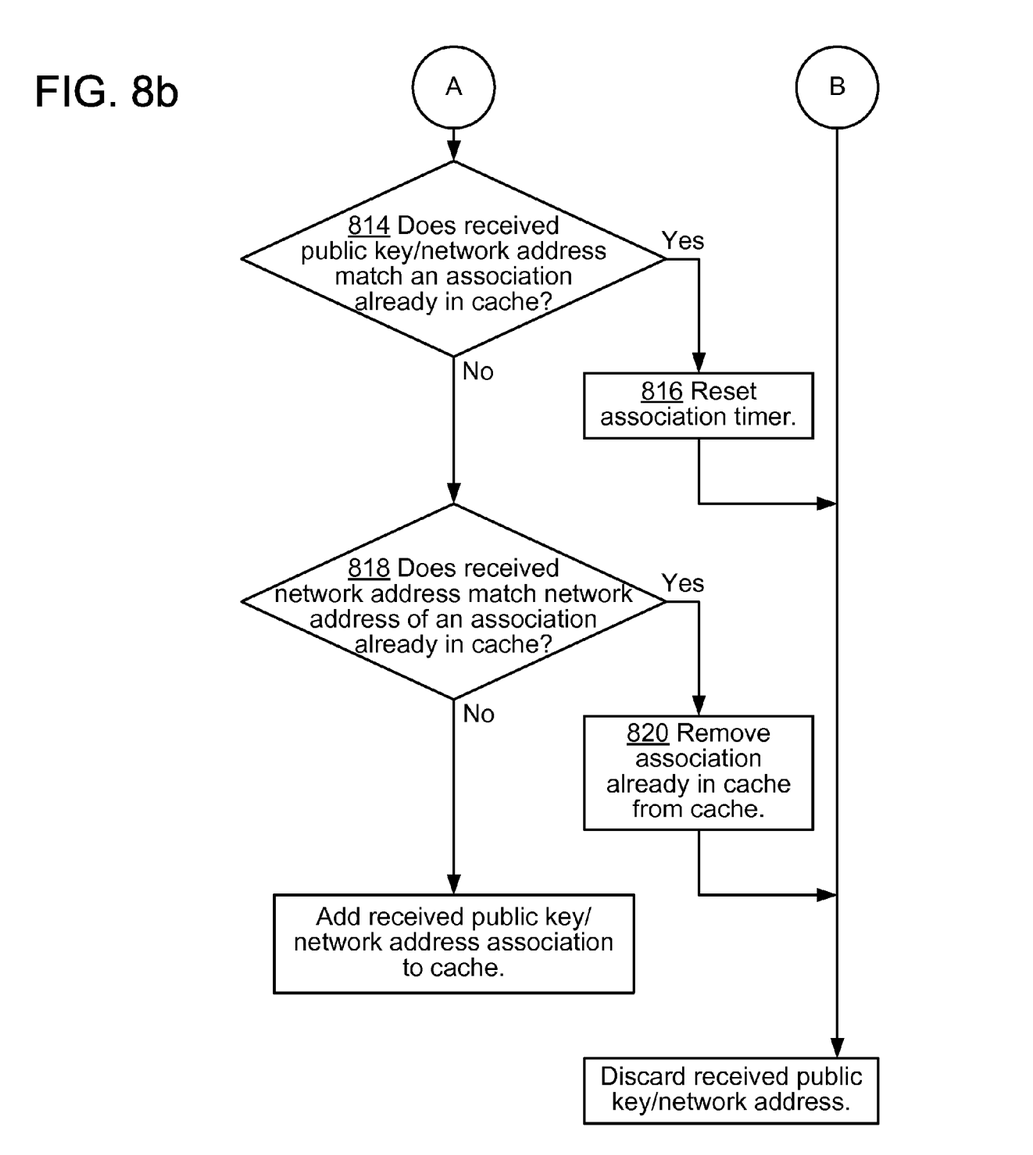

Several advantages follow when a recipient uses aspects of the present invention to create and maintain a cache of authenticated public key/network address associations. The flowchart in FIGS. 8a and 8b show one way that a message recipient can create such a cache. The first parts of this flowchart parallel the procedure depicted in FIG. 7. When a message arrives at the recipient, the message may have a time stamp and, if so, the recipient discards the message in step 800 if the message is out of date. In steps 802, 804, 806, 808, and 810 (parallel to steps 704, 706, 708, 710, and 712 of FIG. 7), the recipient checks the internal consistency of the authentication information in the message. If the authentication fails, then the message is discarded just like in the procedure of FIG. 7. If the authentication information is internally consistent, then in step 812 the recipient compares the received public key/network address with the public key/network address associations already in the cache (if any). If in step 814, the received public key/network address is found to be a duplicate of an association already in the cache, then the new values add no new information to the cache and may be discarded. (Of course, the message contents themselves have already been authenticated and are accepted as shown in the procedure of FIG. 7. That is not depicted here because FIGS. 8a and 8b deal solely with creating and maintaining the cache, not with processing message contents.) In some embodiments, each association in the cache is discarded after a period of non-use. In these embodiments, step 816 resets the use timer of the association already in the cache that matches the values in the present message. If no duplicate association was found in step 814, then step 818 looks for a match of just the network address. If one is found, there may be a problem: two public keys (the one already in the cache and the one in the present message) have been found to be associated with the same network address. This may indicate a brute force attack in which an attacker generates public keys until it finds one that, through the procedures of FIGS. 3 and 4 and the accompanying text, produces a network address to match the one produced by a legitimate sender. The safe course for the recipient is to consider the network address compromised. The message is discarded and the association in the cache with the matching network address is also discarded in step 820. If the network address in the present message is not found to match that of any association already in the cache, then the public key and network address in the present message are used to create a new association in the authentication cache. Through this procedure, a cache of valid public key/network address associations is built and maintained. The next paragraph describes how this cache may be used.

Figure 9:
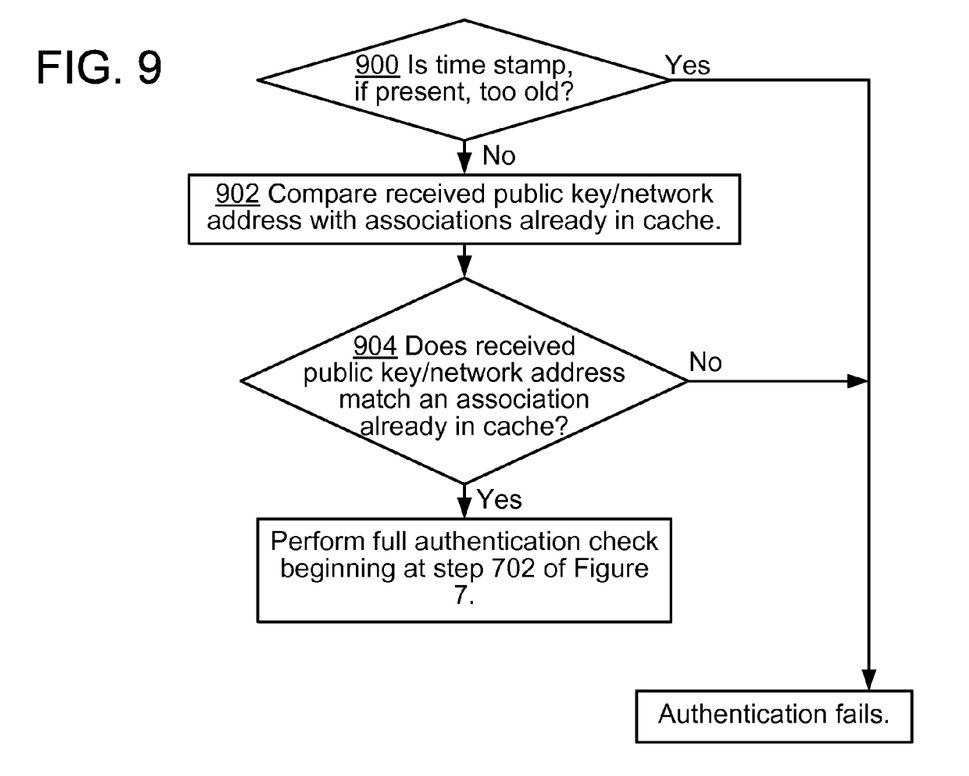
FIG. 9 is a flowchart of a procedure for using a cache of valid public key/network address associations, such as may have been built by the procedure of FIGS. 8a and 8b, to authenticate a message.

With the cache produced by the procedure of FIGS. 8a and 8b in place, the recipient can use it to authenticate incoming messages, especially messages that arrive without public keys. For messages that contain public keys, however, it may seem at first that the cache does not reduce the recipient's processing load because for these messages, the procedures of FIGS. 7, 8a, and 8b must still be performed. That is often true, but an exception makes the cache very valuable. A recipient may be the target of a "Denial of Service" (DOS) attack in which it is flooded with invalid incoming messages. Because decrypting each incoming message according to the procedures of FIGS. 7, 8a, and 8b consumes significant amounts of processor resources, the recipient may be overwhelmed during the attack and may stop performing any useful work. The cache can be used to prevent this. If the number of incoming messages exceeds the number that the recipient can comfortably process, then the recipient processes incoming messages according to the simplified procedure of FIG. 9 instead of the procedures of FIGS. 7, 8a, and 8b. In FIG. 9, after checking a message's time stamp in step 900, the message's public key and network address are compared, in step 902, with public key/network address associations already in the cache. If no match is found in step 904, then the message is discarded. If a match is found, then the message is subjected to the full authentication procedure of FIG. 7. During the DOS attack, this procedure filters out invalid messages without wasting expensive decryption time on them and thus allows the recipient to keep up with valid incoming messages. Of course, the procedure of FIG. 9 only decrypts messages whose public key and network address are already in the cache. It does not allow the recipient to accept an incoming message with a valid, but not previously seen, public key and network address. That is a tradeoff a recipient may be willing to make during the course of the DOS attack. Once the recipient weathers the DOS attack successfully, it reverts to the fuller procedures of FIGS. 7, 8a, and 8b.

In view of the many possible embodiments to which the principles of this invention may be applied, it should be recognized that the embodiments described herein with respect to the drawing figures are meant to be illustrative only and should not be taken as limiting the scope of invention. For example, for performance reasons the cryptographic operations may be implemented in hardware, such as on a network card, rather than in software. Therefore, the invention as described herein contemplates all such embodiments as may come within the scope of the following claims and equivalents thereof.

We claim:

1. A system comprising:
    an access module configured to access authentication information made available by a first computing device, the authentication information including content data, a public key of the first computing device, a first network address of the first computing device, and a digital signature;
    a deriving module configured to derive a portion of a second network address from the public key of the first computing device by taking a portion of a value derived by hashing a combination of the public key and a modifier;
    a validation module configured to validate the digital signature using the public key;
    an accepting module configured to accept the content data when the derived portion of the second network address matches a corresponding portion of the first network address and when the digital signature is valid; and
    one or more processing units configured to execute the access module, the deriving module, the validation module, and the accepting module.

2. The system of claim 1 wherein the access module is configured to access the public key of the first computing device over an insecure channel to a device including at least one of: the first computing device or a key publishing device.

3. The system of claim 1, wherein the authentication information is provided in a single message.

4. The system of claim 1, wherein the content data includes authenticated content data and non-authenticated content data.

5. A system comprising:
    a hashing module configured to hash a public key;
    a comparing module configured to compare a portion of a value produced by the hashing module with another portion of a network address other than a node-selectable portion;
    a choosing module configured to:
        choose a modifier when the portion and the another portion do not match, and
        append the modifier to the public key; and
    one or more processing units configured to execute the hashing module, the comparing module, and the choosing module.

6. The system of claim 5, wherein the another portion comprises an element including one or more of: a "u" bit, a "g" bit, or a portion of a route prefix.

7. The system of claim 5, wherein the hashing module is further configured to obtain a further value by hashing a composite number that is obtained by appending the modifier to the public key.

8. The system of claim 7, wherein the comparing module is further configured to compare a further portion of the further value to the another portion of the network address.

9. The system of claim 8, wherein the choosing module is further configured to:
    choose another modifier when the further portion and the another portion do not match; and
    append the another modifier to the public key and thereby produce an address of the system.

10. The system of claim 7, further comprising:
    a producing module configured to produce an address of the system using the further value.

11. A system comprising:
    an access module configured to access authentication information made available by a first computing device, the authentication information including content data, a public key of the first computing device, a modifier, a first network address of the first computing device, and a digital signature;
    an appending module configured to append the modifier to the public key of the first computing device and to derive a portion of a second network address from a combination of the public key of the first computing device and the modifier;
    a validation module configured to validate the digital signature by using the public key of the first computing device;
    a caching module configured to cache a public key/network address association comprising the public key in association with the first network address when the derived portion of the second network address matches a corresponding portion of the first network address and when the validation shows that the digital signature was generated from at least one of: the content data or a hash value of data including the content data; and
    one or more processing units configured to execute the access module, the appending module, the validation module, and the caching module.

12. The system of claim 11, wherein the content data comprises authenticated content data and non-authenticated content data.

13. The system of claim 11, further comprising:
    a determining module configured to determine whether to cache the public key in association with the first network address based on a time stamp in the authentication information.

14. The system of claim 11, further comprising:
    an associating module configured to associate a timer with the caching of the public key/network address association;
    a timer resetting module configured to reset the timer when a second public key/network address association, identical to the public key/network address association, is presented for caching; and
    a removing module configured to remove the public key/network address association from the cache when the timer expires.

15. The system of claim 11, further comprising:
    a comparing module configured to compare the first network address against another network address in another public key/network address association that is already in the cache; and a discarding module configured to discard the public key and the first network address without caching when the first network address matches the another network address in the another public key/network address association already in the cache, and when the public key does not match another public key of the another public key/network address association that is already in the cache.

16. The system of claim 15, further comprising:
a cache removing module configured to remove the public key/network address association from the cache when the first network address matches the another network address in the another public key/network address association that is already in the cache, and when the public key does not match the another public key of the another public key/network address association that is already in the cache.

17. A system comprising:
an access module configured to access authentication information made available by a first computing device, the authentication information including content data, a public key of the first computing device, and a network address of the first computing device;
a comparing module configured to compare the public key and the network address of the first computing device with a public key/network address association in a cache;
an accepting module configured to accept the content data when the public key and the network address of the first computing device match the public key/network address association in the cache; and
one or more processing units configured to execute the access module, the comparing module, and the accepting module.

18. The system of claim 17, further comprising:
a determining module configured to determine whether to accept the content data based on a time stamp in the authentication information.

19. The system of claim 17, further comprising:
a discarding module configured to discard a message received from a second computing device when:
a second network address of the second computing device matches another network address in the cache, and
a second public key of the second computing device does not match another public key associated with the another network address in the cache.

20. The system of claim 19, further comprising:
a cache removing module configured to remove another public key/network address association between the another network address and the another public key in an instance when the message is discarded.

* * * * *